United States Patent [19]

Onishi

[11] Patent Number: 5,669,623
[45] Date of Patent: Sep. 23, 1997

[54] BABY CARRIAGE AND METHOD OF MANUFACTURING SEAT PLATE FOR ITS SEAT

[75] Inventor: Ichiro Onishi, Osaka, Japan

[73] Assignee: Aprica Kassai Kabushikikaisha, Osaka, Japan

[21] Appl. No.: 517,445

[22] Filed: Aug. 21, 1995

[30] Foreign Application Priority Data

Sep. 21, 1994 [JP] Japan .................................. 6-226217

[51] Int. Cl.$^6$ ...................................... B62B 7/10
[52] U.S. Cl. ........................... 280/642; 16/225; 280/42; 280/650; 297/44
[58] Field of Search ............................ 16/225, DIG. 13; 403/102, 119; 297/42, 44; 280/42, 642, 647, 650, 47.38, 46.4

[56] References Cited

U.S. PATENT DOCUMENTS

| | | |
|---|---|---|
| 1,865,254 | 6/1932 | Howe .................... 280/42 X |
| 2,847,058 | 8/1958 | Lee ........................ 280/42 X |
| 3,501,197 | 3/1970 | Burton . |
| 3,736,021 | 5/1973 | Maclaren . |
| 3,981,532 | 9/1976 | Caldwell . |
| 4,030,769 | 6/1977 | Peng et al. . |
| 4,042,250 | 8/1977 | Rodaway . |
| 4,335,893 | 6/1982 | Carmichael et al. . |
| 4,362,315 | 12/1982 | Kassai . |
| 4,428,598 | 1/1984 | Kassai . |
| 4,493,488 | 1/1985 | Panaia et al. . |
| 4,697,823 | 10/1987 | Kassai . |
| 4,712,830 | 12/1987 | Charbrol et al. . |
| 4,885,820 | 12/1989 | Erceg et al. ................ 16/225 |
| 5,050,663 | 9/1991 | Rhoads et al. ............ 16/225 X |
| 5,101,536 | 4/1992 | Gabriele ............. 16/DIG. 13 X |
| 5,123,129 | 6/1992 | Lyons ................ 16/DIG. 13 X |
| 5,240,276 | 8/1993 | Coombs .................... 297/42 X |
| 5,288,098 | 2/1994 | Shamie . |

FOREIGN PATENT DOCUMENTS

| | | |
|---|---|---|
| 0663332 A2 | 7/1995 | European Pat. Off. . |
| 1237538 | 6/1986 | U.S.S.R. ....................... 280/42 |
| 2044086 | 10/1980 | United Kingdom . |

*Primary Examiner*—Brian L. Johnson
*Assistant Examiner*—Michael Mar
*Attorney, Agent, or Firm*—W. G. Fasse; W. F. Fasse

[57] ABSTRACT

A flat seat plate providing an upper surface which is in contact with a principal region of the lower surface of a seat portion for supporting the seat portion from below is integrated into a part of the body of a baby carriage. The seat plate is divided into three plate-type members, and adjacent ones of the plate-type members are hinged with each other on the respective lower surface sides thereof by flexible sheets. End surfaces of the plate-type members are butted against each other when the seat plate defines a uniform plane.

16 Claims, 8 Drawing Sheets

BABY CARRIAGE AND METHOD OF MANUFACTURING SEAT PLATE FOR ITS SEAT

CROSS REFERENCE TO RELATED APPLICATION:

This application is related to copending application U.S. Ser. No. 08/511,007, filed Aug, 3, 1995, entitled SEAT FOR BABY CARRIAGE.

BACKGROUND OF THE INVENTION

1. Field of the Invention

The present invention relates to a baby carriage which is collapsed along its width, and more particularly, it relates to an improvement in a seat for such a baby carriage. The present invention also relates to a method of manufacturing a seat plate for such a seat.

2. Description of the Background Art

A seat of a collapsible baby carriage is generally formed independently of the body of the baby carriage. The seat, which comprises a seat portion and a backrest portion, is made of a flexible sheet material as a whole, and so mounted on the body of the baby carriage that its shape is retained. Principal parts of the seat portion and the backrest portion are charged with a plate type core member which is made of a relatively rigid material. This core member is so shaped and arranged as not to prevent the operation of collapsing the baby carriage. In a baby carriage which is collapsed widthwise, for example, the core member charged in the seat portion is formed by a plurality of plate-type members which are divided by at least one parting line horizontally extending along the baby carriage. Thus, the seat portion can be bent along the portion(s) between adjacent ones of the plurality of plate-type members, thereby allowing collapse of the baby carriage along the direction of its width.

While the core member which is divided into a plurality of plate-type members as hereinabove described allows collapse of the baby carriage along the direction of its width, however, the seat portion may disadvantageously be bent along the portion(s) between the plurality of plate-type members also in an open state of the baby carriage, to sink the buttocks of a baby who is sat thereon. In order to prevent such a state to the utmost, some baby carriages employ such a design that a rigid rod-shaped link extending widthwise is in contact with the lower surface of the seat portion. However, a region of the seat portion which is supported by such a rod-shaped rigid link is limited to a narrow area, and hence the buttocks of the baby are still sunk into the seat portion in a region not supported by the rigid link.

On the other hand, a baby carriage which is not collapsed widthwise causes substantially no problem of the aforementioned sinking since its seat portion can be charged with an integral core member defining a uniform plane. Thus, the baby carriage which is collapse widthwise is inferior in comfortableness to that which is not collapsed widthwise, due to the aforementioned sinking in the seat portion.

SUMMARY OF THE INVENTION

Accordingly, an object of the present invention is to prevent the aforementioned problem of sinking which can be caused in a seat portion of the aforementioned seat in a baby carriage which is collapsed widthwise.

Another object of the present invention is to provide a method of manufacturing a seat plate for the aforementioned seat of the baby carriage.

As hereinabove described, the present invention is directed to a baby carriage which is collapsed along its width, comprising a seat, including a seat portion and a backrest portion, which is so rendered deformable as to allow a widthwise collapsing operation. A pair of side bars are arranged on the lower surface of the seat portion along respective sides of the seat portion. The space between the pair of side bars is changeable in response to the operation for collapsing the baby carriage along its width. A seat plate extends across the pair of side bars. This seat plate provides an upper surface which is in contact with a principal region of the lower surface of the seat portion, to support the seat portion from below.

The aforementioned seat portion comprises a plurality of plate-type members of a relatively rigid material, which are divided by at least one dividing line extending along the lengthwise direction of the baby carriage, and a hinge portion hinging adjacent ones of the plurality of plate-type members with each other on lower surface sides thereof. The plurality of plate-type members have end surfaces which are butted against each other between the adjacent ones when the upper surface of the seat plate defines a uniform plane.

The present invention is also directed to a method of manufacturing a flat seat plate, supporting a seat portion provided on a seat of a baby carriage from below, comprising a plurality of plate-type members, adjacent ones of which are hinged with each other on lower surface sides respectively. This method comprises the steps of preparing a mold assembly for integrally molding the seat plate so that its upper surface defines a uniform plane and a space is formed between adjacent ones of the plurality of plate-type members, injecting resin into the mold assembly for integrally molding the seat plate, and then mounting a spacer member on at least one of the adjacent ones of the plate-type members to fill up the space.

In the baby carriage according to the present invention, the seat plate partially forms the body of the baby carriage. This seat plate comprises a plurality of plate-type members which are divided by a dividing line extending along the lengthwise direction of the baby carriage. These plate-type members are hinged with each other, thereby allowing collapse of the baby carriage along its width.

The hinge portion hinging the plurality of plate-type members with each other is positioned on the lower surface sides of the plate-type members so that the end surfaces of the plurality of plate-type members are butted against each other between the adjacent ones thereof when the upper surface of the seat plate defines a uniform plane in an open state of the baby carriage. Thus, the seat plate can maintain the uniform plane also when the weight of the baby is applied to the seat plate from above. This seat plate provides an upper surface which is in contact with the principal region of the lower surface of the seat portion for supporting the same from below, whereby the seat portion can also maintain a uniform plane.

According to the inventive baby carriage, therefore, it is possible to prevent the buttocks of the baby who is sat on the seat from being sunk into the seat portion. Thus, the weight of the baby can be dispersed along a relatively wide area on the seat portion.

It has been recognized that the femoral muscles of the baby are relatively strained when the buttocks are sunk into the seat portion. According to the inventive baby carriage, such sinking can be so prevented that the femoral muscles can be released from strain. Thus, the baby carriage according to the present invention will not fatigue the baby who is sat thereon for a relatively long time.

Further, the seat plate partially forms the body of the baby carriage and has a relatively wide area capable of providing an upper surface which is in contact with the principal region of the lower surface of the seat portion, whereby the parallel relation between the pair of side bars can be relatively reliably maintained by such a seat plate itself. Thus, the body of the baby carriage can be further improved in strength due to the presence of the seat plate.

In the baby carriage according to the present invention, the hinge portion is preferably provided by a flexible sheet which is bonded to the lower surfaces of the plate-type members in a state extending over both of the adjacent ones of the plate-type members. When a flexible sheet is thus employed for the hinge portion, the hinge portion can be compactly formed to prevent the baby carriage from being increased in size and weight.

At least one of the butted end surfaces of the plate-type members is preferably provided by a spacer member which is independent of the principal parts of the plate-type members. Due to this structure, adjustment for attaining a proper butted state of the end surfaces of the plate-type members can be carried out by adjusting the dimensions of the spacer member, whereby the proper butted state can be implemented at a lower cost as compared with dimensional adjustment of the overall plate-type members.

According to the inventive method of manufacturing a seat plate, on the other hand, the seat plate can be efficiently obtained due to integral molding.

Further, the step of mounting the spacer member to the plate member(s) is employed as hereinabove described, whereby the integral molding of the plate-type members is so carried out that a space is defined in a portion to be provided with the spacer member. Therefore, the thickness can be sufficiently increased in a prescribed portion of the mold assembly for defining such a space, thereby improving the strength of the mold assembly. If no spacer member is employed, the end surfaces of the adjacent ones of the plate-type members must be butted against each other when the upper surface of the seat plate defines a uniform plane in the stage of integrally molding the seat plate, and hence the space must be extremely narrow. A prescribed portion of the mold assembly for defining such a narrow space must be extremely small in thickness, and hence the strength of the mold assembly may be considerably reduced in this case.

In the method of manufacturing a seat plate according to the present invention, a flexible sheet for implementing hinging is preferably prepared and inserted in the mold assembly, thereby forming the hinge portion. Thus, the hinge portion can be efficiently formed by the flexible sheet which is independent of the seat plate, while reliability in the bonded state between the flexible sheet and the plate-type members can be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
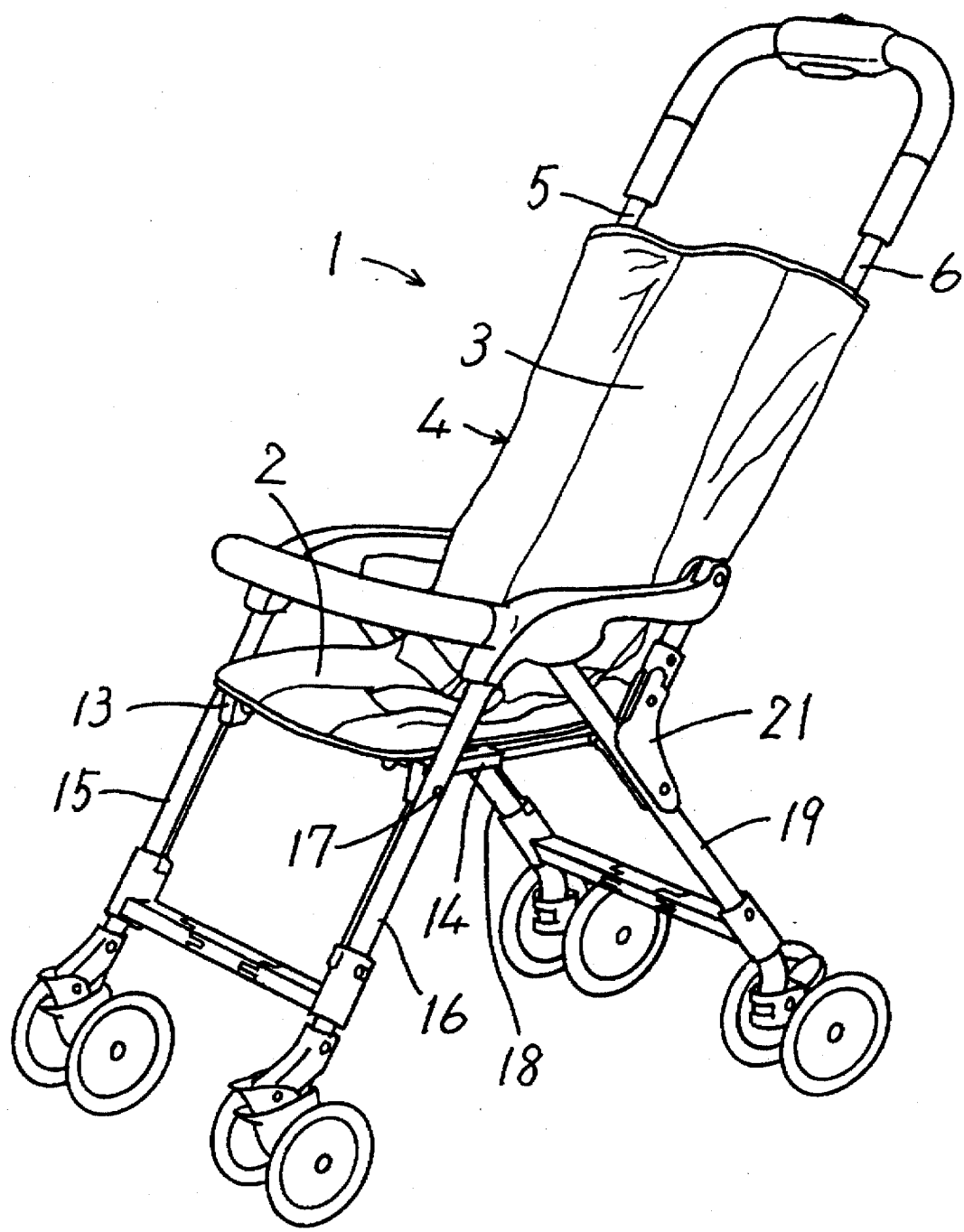
FIG. 3 is a perspective view showing the baby carriage 1 of FIG. 1 with addition of the seat 4.
Figure 4:
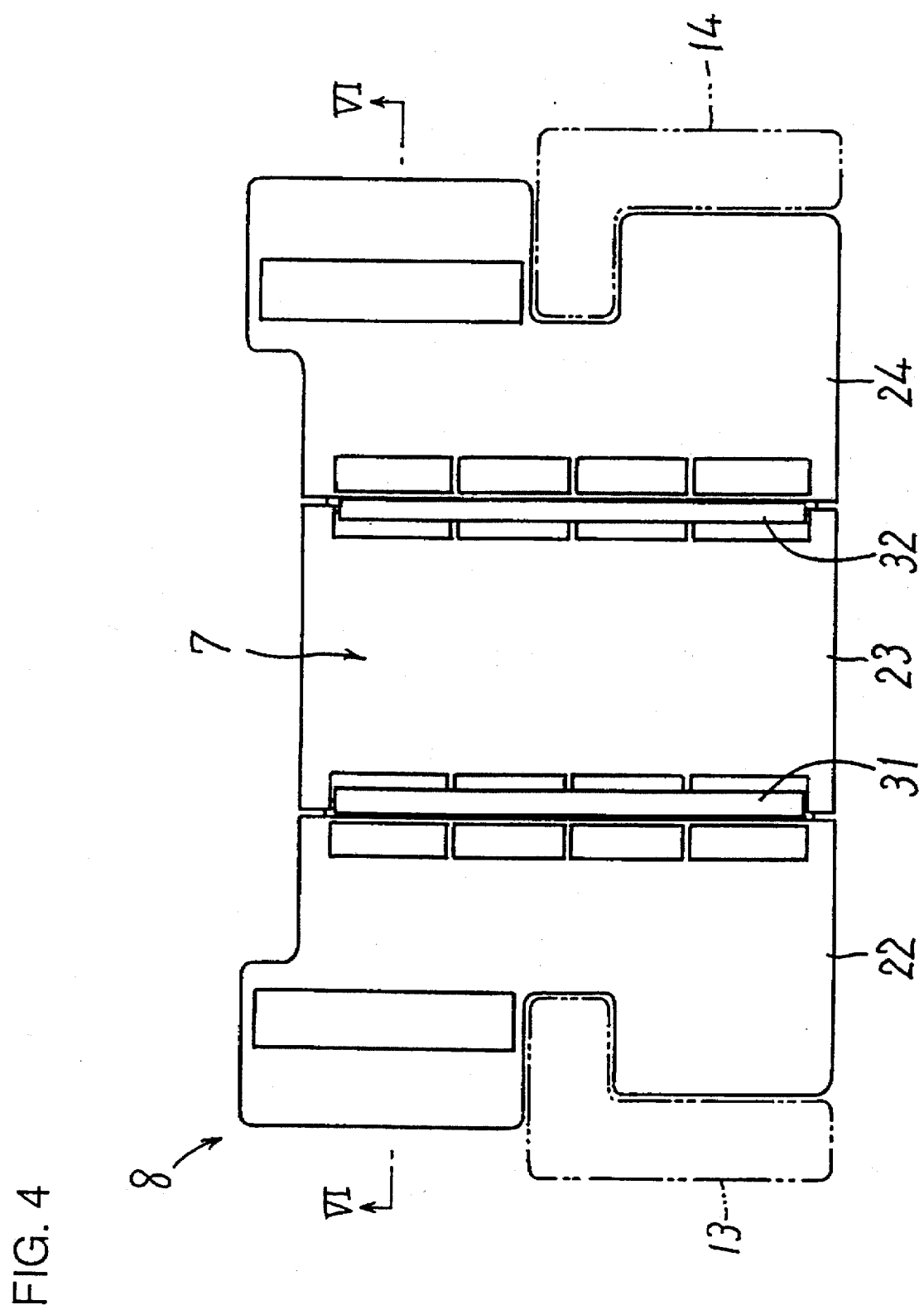
FIG. 4 is a plan view independently showing a seat plate 8 appearing in FIG. 1.
Figure 5:
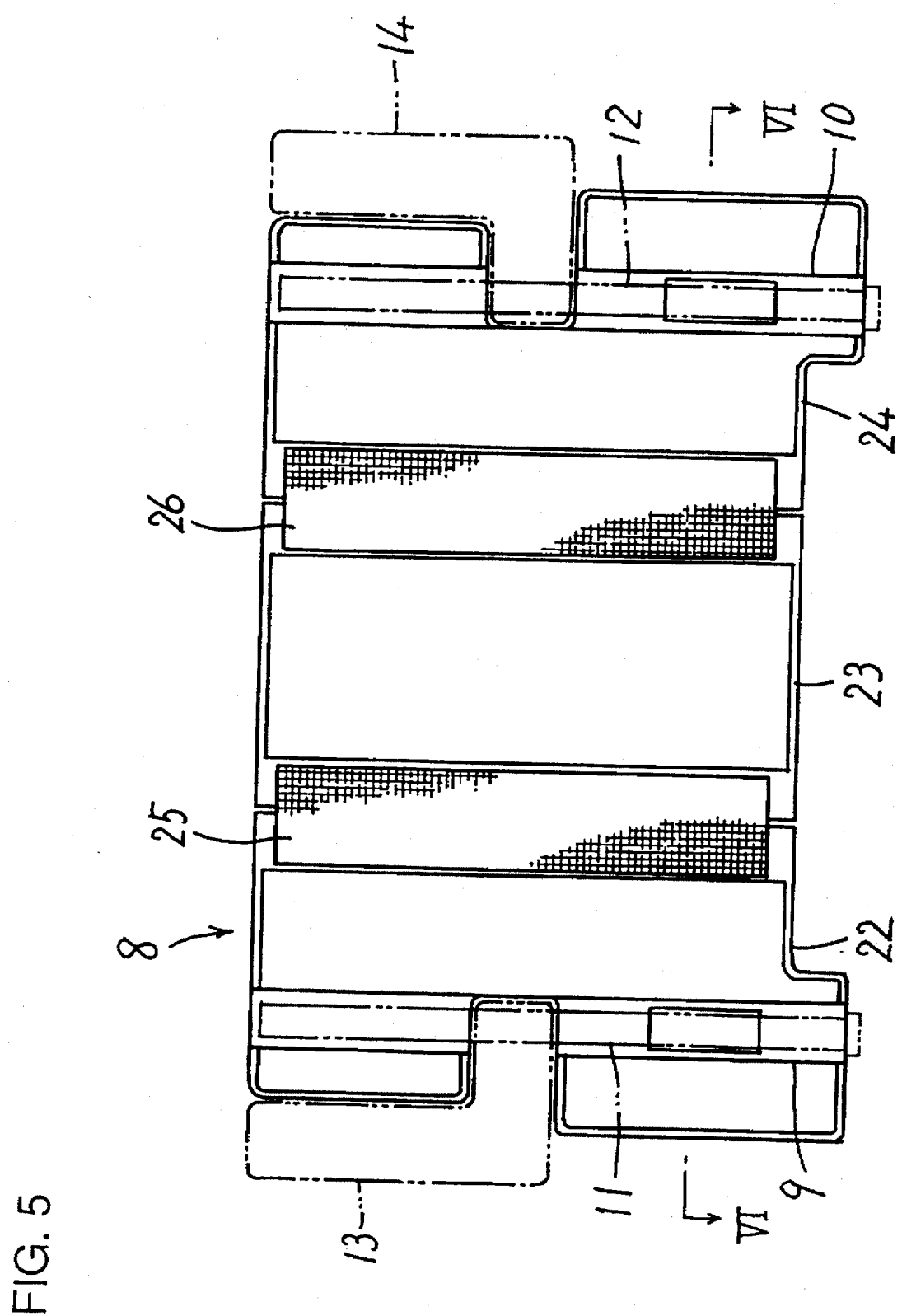
FIG. 5 is a bottom plan view of the seat plate 8 shown in FIG. 4.

FIG. 3 is a perspective view showing the appearance of a baby carriage 1 according to an embodiment of the present invention. As shown in FIG. 3, the baby carriage 1 comprises a seat 4 including a seat portion 2 and a backrest portion 3. The seat 4 is made of a flexible sheet material as a whole, and charged with a proper cushion material. Both side edges of the backrest portion 4 are mounted on a pair of push rods 5 and 6 respectively. The backrest portion 3 is charged with a proper core material.

Figure 1:
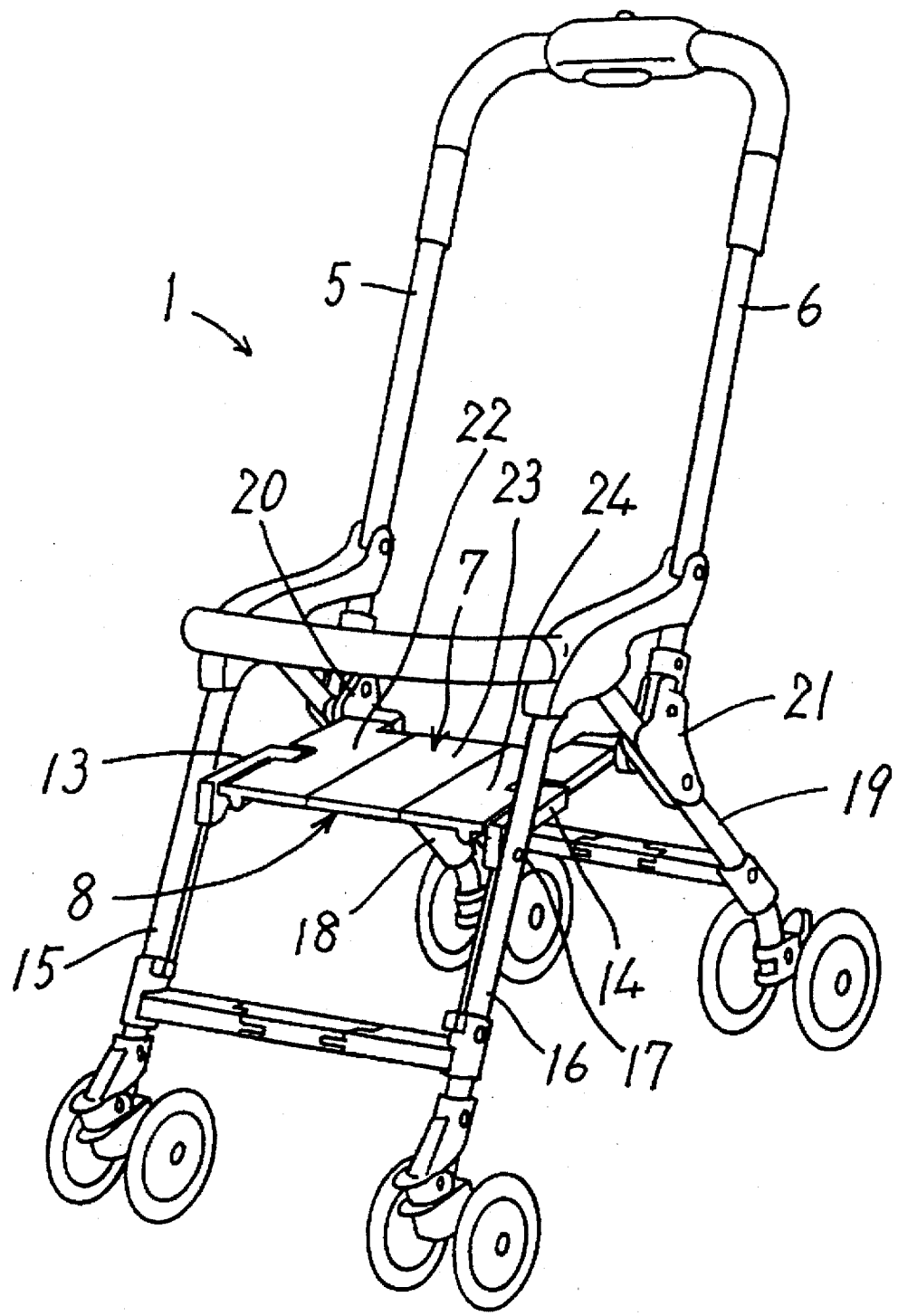
FIG. 1 is a perspective view showing a baby carriage 1 according to an embodiment of the present invention in an open state, from which a seat 4 is removed.
Figure 2:
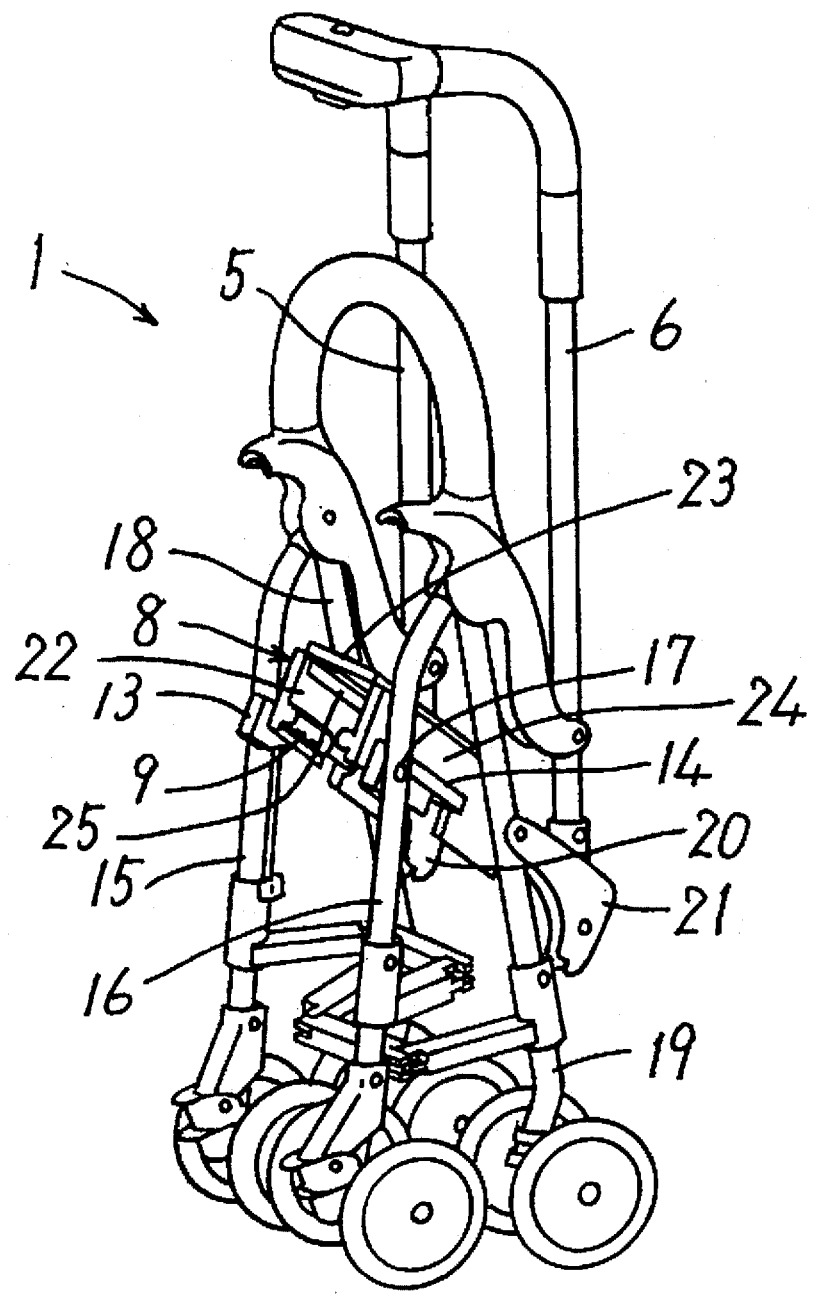
FIG. 2 is a perspective view showing the baby carriage 1 of FIG. 1 in a closed state.

This baby carriage 1 is shown in FIGS. 1 and 2 with omission of the seat 4. FIGS. 1 and 2 show the baby carriage 1 in open and closed states respectively. This baby carriage 1 can be collapsed along its width, as shown in FIG. 2. The aforementioned seat 4 is deformable, to allow such a widthwise collapsing operation.

The baby carriage 1 comprises a flat seat plate 8 providing an upper surface 7 which is in contact with a principal region of the lower surface of the seat portion 2 for supporting the seat portion 2 from below. The upper surface 7 of the seat plate 8 defines a uniform plane in the open state of the baby carriage 1 as shown in FIG. 1, while the same upwardly projects in the closed state of the baby carriage 1 as shown in FIG. 2. FIGS. 4 to 8 show the structure of the seat plate 8 in detail.

A pair of bar receiving portions 9 and 10 are formed on the lower surfaces of both sides of the seat plate 8. These bar receiving portions 9 and 10 receive a pair of side bars 11 and 12, shown by phantom lines in FIG. 5, to be rotatable about axes thereof respectively. The side bars 11 and 12 are arranged along the respective sides of the seat portion 2 on its lower surface, and the space therebetween is changeable following the widthwise collapsing operation for the baby carriage 1. The respective longitudinal centers of the side bars 11 and 12 are held by brackets 13 and 14, which in turn are rotatably mounted on front legs 15 and 16 respectively. FIGS. 1 to 3 show a pin 17 for rotatably mounting the bracket 14 on the front leg 16. On the other hand, the rear ends of the side bars 11 and 12 are rotatably held by brackets 20 and 21 which are rotatably mounted on a pair of rear legs 18 and 19 respectively.

The seat plate 8 comprises three plate-type members 22, 23 and 24 which are divided by two dividing lines extending along the lengthwise direction of the baby carriage 1. These plate-type members 22 to 24 are made of a relatively rigid material such as hard plastic, for example.

Adjacent ones of the plate-type members 22 to 24 are hinged with each other on the lower surface sides respectively. Flexible sheets 25 and 26 which can be repetitively bent, for example, are employed for such hinging. The flexible sheets 25 and 26 are advantageously prepared from mesh sheets which are made of polyester filament, for example. The flexible sheets 25 and 26 are bonded to the respective lower surfaces of the plate-type members 22 to 24 while extending over both of the plate-type members 22 and 24 and both of the plate-type members 23 and 24 respectively. Insert molding is advantageously employed for this hinging, as described later.

Figure 6:
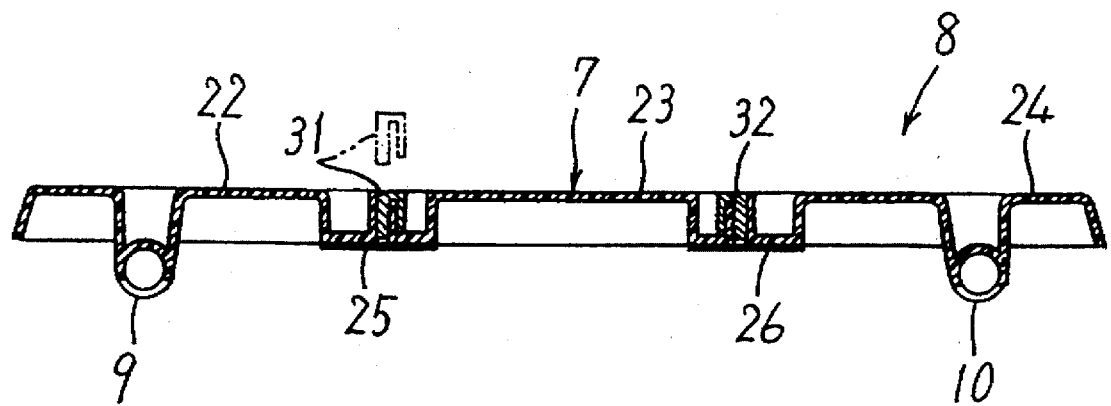
FIG. 6 is a sectional view taken along the lines VI—VI in FIGS. 4 and 5.
Figure 7:
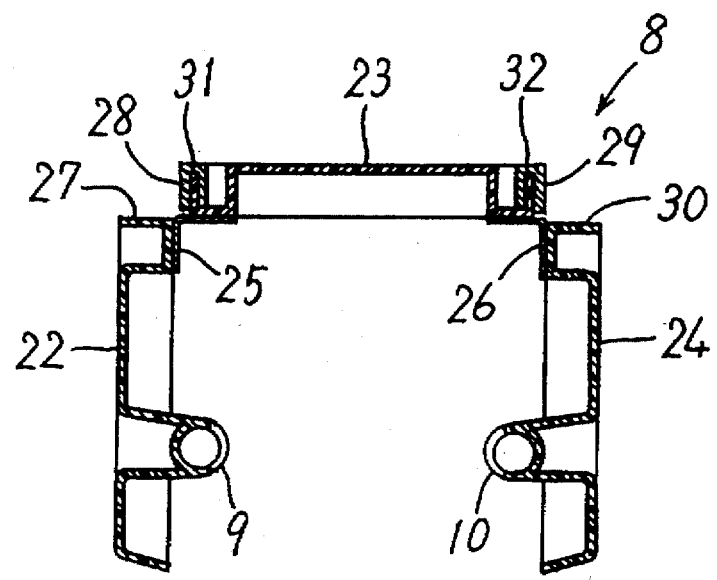
FIG. 7 is a sectional view corresponding to FIG. 6, showing a bent state of the seat plate 8.

When the plate-type members 22 to 24 define a uniform plane, the adjacent pair of plate-type members 22 and 23 have end surfaces 27 and 28 (see FIG. 7) which are butted against each other, while the other adjacent pair of plate-type members 23 and 24 also have end surfaces 29 and 30 (see FIG. 7) which are butted against each other respectively. Thus, the seat plate 8 can be bent as shown in FIGS. 2 and 7, while the same cannot be bent in directions opposite to those shown in FIG. 7 etc. from the state defining a uniform plane shown in FIG. 6 etc. Thus, the seat plate 8 can maintain the plane state also when downward force is applied to the central plate-type member 23, for example. The bar receiving portions 9 and 10 receiving the side bars 11 and 12 are positioned downward beyond the hinge portions provided by the flexible sheets 25 and 26 as shown in FIG. 6, whereby the bent state shown in FIG. 7 can be smoothly attained when the pair of side bars 11 and 12 approach to each other following the collapsing operation for the baby carriage 1.

Figure 8:
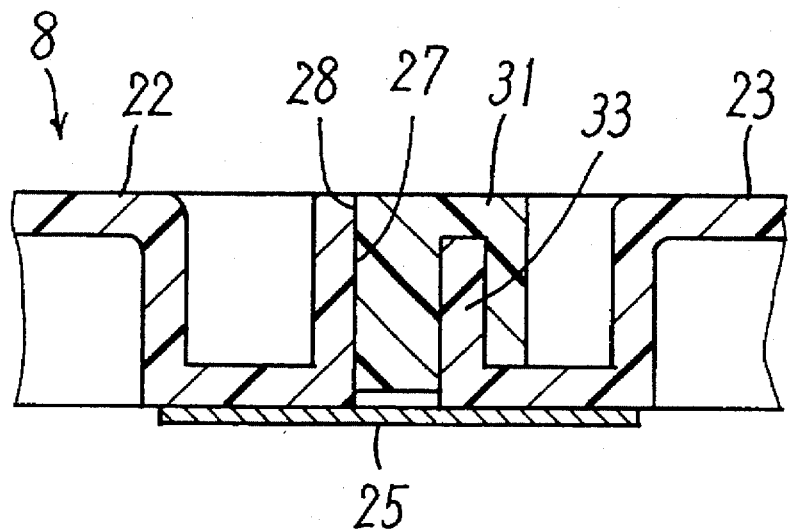
FIG. 8 is a sectional view showing a portion provided with a spacer 31 appearing in FIG. 6 in an enlarged manner.

Single ones of the end surfaces 27 and 28 as well as 29 and 30 butted against each other are provided by spacer members 31 and 32 which are independent of a principal portion of the plate-type member 23. The spacer members 31 and 32 are mounted on the plate-type member 23 by engagement from above, as shown by phantom lines in FIG. 6 as to the spacer member 31. FIG. 8 is an enlarged view showing the portion provided with the spacer member 31.

As clearly shown in FIG. 8, the spacer member 31 has an inverted U-shaped section, and is located by elastically holding an edge rib 33 of the plate-type member 23. The spacer member 31 has a thickness filling up the space between the plate-type members 22 and 23. The other spacer member 32 has a structure which is substantially identical to the above.

Figure 9:
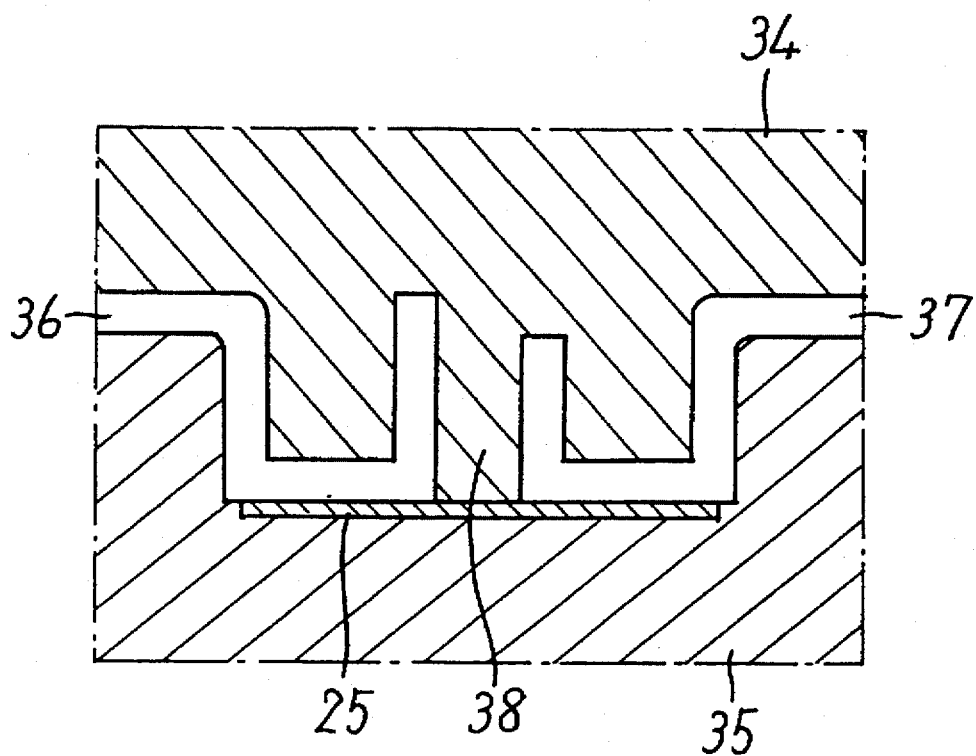
FIG. 9 is a sectional view partially showing molds 34 and 35 for obtaining the seat plate 8 by molding.

The seat plate 8 is integrally molded in such a state that the plate-type members 22 to 24 are connected with each other by the flexible sheets 25 and 26. FIG. 9 partially shows first and second molds 34 and 35 for such integral molding respectively. The portion shown in FIG. 9 corresponds to that appearing in FIG. 8. The molds 34 and 35 have cavities 36 and 37 for integrally molding the seat plate 8 so that its upper surface 7 defines a uniform plane and spaces are defined between the adjacent ones of the plate-type members 22 to 24. After the flexible sheets 25 and 26 are inserted in the molds 34 and 35, resin is injected into the cavities 36 and 37. A portion 38 provided on the first mold 34 is adapted to define the space between the plate-type members 22 and 23. This space, which is filled up with the spacer member 31 later, can be so arbitrarily widened that the thickness of the portion 38 of the mold 34 can be sufficiently increased. Thus, the mold 34 can be prevented from formation of a mechanically weak portion, whereby its life can be sufficiently increased.

When the resin is injected into the cavities 36 and 37 which are defined between the molds 34 and 35, this resin can be strongly bonded with the flexible sheet 25.

The flexible sheets 25 and 26 may be bonded to the plate-type members 22 to 24 not by the aforementioned insert molding but by adhesion with an adhesive, for example.

Further, the hinge portions may not be formed by the flexible sheets 25 and 26, but thin hinge portions integrally extending from the plate members 22 to 24 may alternatively be formed in molding of the seat plate 8.

While single ones of the end surfaces 27 and 28 as well as 29 and 30 which are butted against each other in the plane state of the seat plate 8 are provided by the spacer members 31 and 32 respectively in the aforementioned embodiment, both of the end surfaces 27 and 28 as well as both of the end surfaces 29 and 30 may alternatively be provided by spacer members.

Although the seat plate 8 is divided into three plate-type members 22 to 24 in the aforementioned embodiment, the same may alternatively be divided into two or four or more plate-type members.

When the seat plate 8 is not integrally molded, hinge members comprising pivot shafts, for example, may be employed for hinging the plurality of plate members 22 to 24 with each other.

Figure 10A:
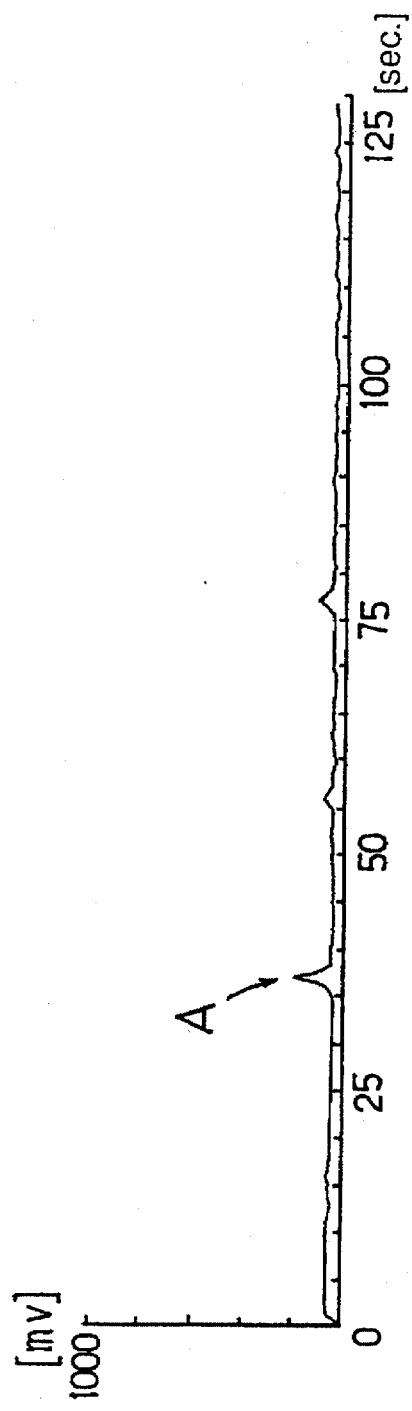
FIGS. 10A and 10B are electromyograms which were measured in a state sitting babies on the seat 4 according to the embodiment of the present invention and a conventional seat respectively.
Figure 10B:
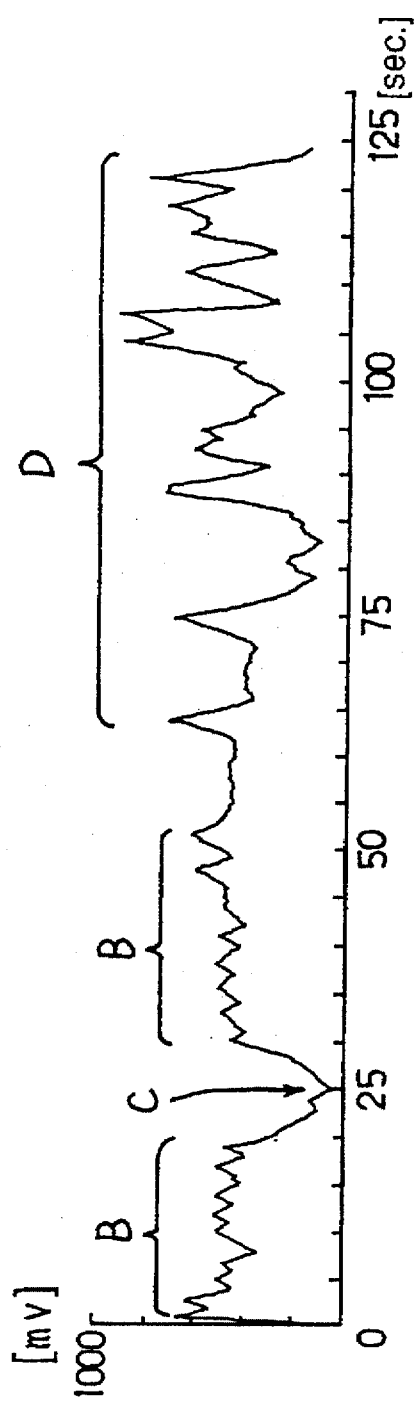

FIGS. 10A and 10B are electromyograms which were measured for confirming the preferable effect attained by the seat provided in the baby carriage according to the present invention. These electromyograms were measured by sitting babies on seats of baby carriages in practice while attaching electrodes onto their thighs at intervals of 2 cm. FIG. 10A shows the case of the seat 4 according to the embodiment of the present invention, and FIG. 10B shows the case of a comparative seat which was charged with a core member merely divided into a plurality of portions.

The electromyogram shown in FIG. 10A exhibits transition at low levels substantially with no fluctuation. A peak A, for example, was obtained when the baby moved its legs. On the other hand, the electromyogram shown in FIG. 10B exhibits extreme fluctuation at relatively high levels. The regular fluctuation B, for example, shows muscular strain. Further, depression C shows temporary relaxation of the muscular strain. In addition, irregular and extreme fluctuation D in the rear half of the electromyogram shows muscular fatigue.

Comparing the electromyograms shown in FIGS. 10A and 10B with each other, it is understood possible to sit a baby on the seat 4 according to the present invention in a state releasing its thighs from strain, thereby providing a comfortable state for the baby. This is because the buttocks of the baby are not sunk into the seat portion 2 receiving its weight and concentration of the weight to a specific portion is prevented since the seat plate 8 maintains a plane state.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A baby carriage that is collapsible in a direction of its width by a widthwise collapsing operation, comprising:

a seat including a seat portion and a backrest portion that is deformable so as to allow said widthwise collapsing operation;

a pair of side bars arranged on a lower surface of said seat portion along respective side thereof, wherein a spacing distance between said side bars is changeable in accordance with said widthwise collapsing operation; and a flat seat extending across said pair of side bars and providing an upper surface that is in supporting contact with a principal region of said lower surface of said seat portion, wherein said seat plate comprises a plurality of plate-type members of a relatively rigid material divided from one another by at least one dividing line extending along a front-to-back direction of said seat plate, and a hinge portion hinging adjacent one of said plurality of plate-type members with each other on respective lower surface thereof, wherein said plurality of plate-type members have respective edge surfaces that are butted against each other between said adjacent plate-type members when said upper surface of said seat plate defined a uniform plane, wherein at least one of said plate-type members comprises a major plate body and a substantially rigid spacer member independent of said major plate body and mounted on an edge therof to form a respective one of said edge surfaces, and wherein said major plate body has edge flange defining said edge surface thereof and extending along said front-to-back direction of said seat plate, said spacer member has a U-shaped cross-section with a channel formerd formed between two shanks thereof, and said spacer member is mounted on said edge flange with said edge flange received in said channel.

2. The baby carriage in accordance with claim 1, wherein said hinge portion comprises a flexible sheet that is bonded to said lower surfaces of said plate-type members so as to extend over said dividing line and overlap said adjacent ones of said plate-type members.

3. The baby carriage in accordance with claim 1, wherein each one of said edge surfaces butted against each other is a respective single planar surface extending along an entire longitudinal length of said seat plate in said front-to-back direction.

4. The baby carriage in accordance with claim 1; wherein said edge flange extends along a plane substantially perpendicular to a major plane of said major plate body.

5. The baby carriage in accordance with claim 1, wherein respective ones of said plate-type members are mounted on said side bars so as to be freely rotatable about axes of said side bars, and wherein said edge surfaces being butted against each other substantially exclusively maintain said seat plate with said upper surface thereof in said uniform plane and prevent said seat plate from bending downward along said dividing line.

6. A baby carriage that can be collapsed widthwise, comprising:

a carriage frame;

two side bars connected to said frame and extending spaced apart and parallel to each other generally in a front-to-back longitudinal direction of said baby carriage; and a seat plate that is mounted on and extends between said two side bars;

wherein said seat plate comprises:

a plurality of substantially rigid plate members that extend in said longitudinal direction, are arranged adjacent one another respectively along at least one dividing line extending in said longitudinal direction, and have respective paired adjacent side edge surfaces spaced apart from each other with a gap therebetween and extending along said at least one dividing line, a hinge element arranged on respective bottom surfaces of said adjacently arranged plate members along said dividing line so as to bendably interconnect said adjacently arranged plate members, and a spacer member interposed between said adjacent side edge surfaces so as to span said gap and form a force-transmitting abutment of said adjacent side edge surfaces through said spacer member in cooperation with said hinge element when said plate members are aligned with each other in a substantially horizontal plane, wherein at least a first one of said plate members includes a side edge flange extending along said dividing line on a plane substantially perpendicular to a major plane of said first plate member and forming said first side edge surface, and wherein said spacer member has therein a groove extending therealong and is mounted with said edge flange received in said groove.

7. The baby carriage in accordance with claim 6, wherein said spacer member is mounted on only a first one of said respective paired side edge surfaces and is not connected to a second one of said respective paired side edge surfaces.

8. The baby carriage in accordance with claim 6, wherein said spacer member is substantially rigid and non-flexible.

9. The baby carriage in accordance with claim 6, wherein said plate members comprise a molded resin material, and said hinge element comprises a flexible sheet that is directly molded onto said resin material at said respective bottom surfaces.

10. The baby carriage in accordance with claim 6, further comprising two support brackets respectively arranged to provide said connecting of said side bars to said carriage frame, and wherein said seat plate is mounted on said side bars with respective widthwise outer ones of said plate members respectively rotatably receiving said side bars such that said outer plate members are freely rotatable about axes of said side bars.

11. The baby carriage in accordance with claim 10, wherein said support brackets support said side bars at respective center portions thereof along said longitudinal direction.

12. The baby carriage in accordance with claim 11, wherein said carriage frame comprises front legs and rear legs, wherein said support brackets are rotatably connected to said front legs, and further comprising two rear brackets respectively rotatably connected to rear ends of said side bars and to said rear legs.

13. The baby carriage in accordance with claim 10, wherein said outer plate members respectively comprise a recess in an outer side edge thereof, and said support brackets respectively comprise a bracket arm that respectively reaches into said recess where said bracket arm is connected to a respective one of said side bars.

14. The baby carriage in accordance with claim 6, wherein respective ones of said plate members are mounted on said side bars so as to be freely rotatable about axes of said side bars, and wherein said spacer member forming said force-transmitting abutment in cooperation with said hinge element substantially exclusively maintain said plate members aligned with each other in said substantially horizontal plane and prevent said seat plate from bending downward below said plane along said dividing line.

15. The baby carriage in accordance with claim 6, wherein said seat plate is arranged above respective axes of said side bars, and is mounted on said side bars with respective widthwise outer ones of said plate members respectively rotatably connected with said side bars so as to be respectively freely rotatable about said axes.

16. A baby carriage that can be collapsed widthwise, comprising:

a carriage frame;

two side bars connected to said frame and extending spaced apart and parallel to each other generally in a front-to-back longitudinal direction of said baby carriage; and a seat plate that is mounted on and extends between said two side bars;

wherein said seat plate comprises:

a plurality of substantially rigid plate members that extend in said longitudinal direction, are arranged adjacent one another respectively along at least one dividing line extending in said longitudinal direction, and have respective paired adjacent side edge surfaces spaced apart from each other with a gap therebetween and extending along said at least one dividing line, a hinge element arranged on respective bottom surfaces of said adjacently arranged plate members along said dividing line so as to bendably interconnect said adjacently arranged plate members, and a spacer member interposed between said adjacent side edge surfaces so as to span said gap and form a force-transmitting abutment of said adjacent side edge surfaces through said spacer member in cooperation with said hinge element when said plate members are aligned with each other in a substantially horizontal plane, and further comprising two support brackets respectively arranged to provide said connecting of said side bars to said carriage frame, wherein said seat plate is mounted on said side bars with respective widthwise outer ones of said plate members respectively rotatably receiving said side bars such that said outer plate members are freely rotatable about axes of said side bars, said support brackets have rearward ends connected to said side bars at respective center portions thereof along said longitudinal direction, said carriage frame comprises front legs and rear legs, and said support brackets have forward ends rotatably connected to said front legs.

* * * * *

UNITED STATES PATENT AND TRADEMARK OFFICE
CERTIFICATE OF CORRECTION

PATENT NO. : 5,669,623  
DATED : September 23, 1997  
INVENTOR(S) : Onishi

Page 1 of 7

It is certified that error appears in the above-identified patent and that said Letters Patent is hereby corrected as shown below:

Title Page: In the ABSTRACT:
- line 1: after "A" insert --baby carriage includes a--; after "is", insert --substantially supportingly rigid and which is--;
- line 3: after "portion" (first occurrence), insert --of a seat--; after "below", insert --. The seat plate--;
- line 4: replace "a", by --the--;
- line 7: replace "lower surface sides", by --bottom surfaces--;
- line 8: after "End", insert --or edge--;
- line 10: replace "plane.", by --plane, such that the seat can bend upward but not downward from the flat uniform plane configuration. A spacer member is provided to conveniently define at least respective ones of the abutting edge surfaces.--;

Col. 1,
- line 15: replace "collapsed", by --collapsible--;
- line 23: replace "made", by --typically made--;
- line 26: replace "are charged with" by --have inserted therein--;
- line 30: replace "charged" by --provided--;
- line 32: after "divided", insert --from each other--;
- line 42: replace "to sink" by --which causes--;
- line 43: replace "sat thereon." by --seated thereon to sink uncomfortably into the seat.--;
- line 44: delete "such";
- line 45: replace "that" by --in which--;

UNITED STATES PATENT AND TRADEMARK OFFICE
CERTIFICATE OF CORRECTION

PATENT NO. : 5,669,623
DATED : September 23, 1997
INVENTOR(S) : Onishi

It is certified that error appears in the above-identified patent and that said Letters Patent is hereby corrected as shown below:

Col. 1,
- line 49: replace "are still sunk" by --will still sink--;
- line 51: replace "collapsed" by --collapsible--;
- line 53: after "charged" insert --, i.e. filled or reinforced,--;
- line 54: after "the" insert --conventional--,
- line 55: replace "collapse" by --collapsible--;
- line 56: replace "comfortableness" by --comfort when compared--; replace "collapsed" by --collapsible--;
- line 64: replace "collapsed" by --collapsible--;

Col. 2:
- line 2: replace "collapsed" by --collapsible--;
- line 7: after "space" insert --or spacing distance--.
- line 17: after "lengthwise" insert --or front-to-back--;
- line 20: after "end" insert --or edge--;
- line 21: replace "ones" by --members--;
- line 24: replace "plate," by --plate for--;
- line 27: after "sides" insert --thereof--.
- line 45: after "end" insert --or edge--;
- line 57: replace "sat" by --seated--;
- line 58: replace "being sunk" by --sinking--;
- line 62: after "the" insert --baby's--, replace "are sunk" by --sink--;
- line 64: delete "so"; after "prevented" insert --so--;
- line 67: replace "sat" by --seated--;

UNITED STATES PATENT AND TRADEMARK OFFICE
CERTIFICATE OF CORRECTION

PATENT NO. : 5,669,623
DATED : September 23, 1997
INVENTOR(S) : Onishi

It is certified that error appears in the above-identified patent and that said Letters Patent is hereby corrected as shown below:

Col. 3:
- line 17: after "end" insert --or edge--.
- line 20: after "structure," insert --an--.
- line 50: after "while" insert --the--, replace "in the" by --of the bond--;
- line 51: delete "bonded state";
- line 61: (actual line count): replace "is removed;" by --has been removed for clearly showing the features of the invention;--;
- line 65: (actual line count): delete "addition of", after "seat 4" insert --having been reinstalled--.

Col. 4:
- line 7: after "Fig. 6," insert --but--;
- line 9: replace "a" (first occurrence) by --an enlarged--;
- line 10: delete "in an enlarged manner";
- line 14: delete "a state sitting", after "babies" insert --respectively sitting--;
- line 24: (actual line count): replace "charged" by --is filled or padded--;
- line 27: (actual line count): replace "charged" by --filled or reinforced--.
- line 29: (actual line count): delete "omission of", after "seat 4" insert --having been removed for clearly showing features of the invention--;
- line 46: (actual line count): after "Fig. 5," insert --so as--;
- line 49: (actual line count): after "space" insert --or spacing distance--;
- line 50: (actual line count): replace "following" by --along with--.

UNITED STATES PATENT AND TRADEMARK OFFICE
CERTIFICATE OF CORRECTION

PATENT NO. : 5,669,623
DATED : September 23, 1997
INVENTOR(S) : Onishi

It is certified that error appears in the above-identified patent and that said Letters Patent is hereby corrected as shown below:

Col. 4:
    line 60: (actual line count):
        after "divided" insert --from each other--;
    line 61: (actual line count):
        after "lengthwise" insert --or front-to-back--.

Col. 5:
    line 13: after "end" insert --or edge--, replace "Fig. 7" by --Figs. 6 and 7--;
    line 15: after "end" insert --or edge--;
    line 16: replace "Fig. 7" by --Figs. 6 and 7--; after "respectively." insert --The edge surfaces are each formed by a respective single planar surface extending along an entire longitudinal or front-to-back length of the seat plate as shown in Figs. 1 and 4 to 7.--;
    line 17: after "bent" insert --upward--;
    line 18: after "bent" insert --downward, i.e.--;
    line 28: replace "approach to" by --move toward--;
    line 33: after "portion" insert --or major plate body--.
    line 40: after "rib" insert --or flange--; after "23." insert --The rib 33 extends along the longitudinal or front-to-back direction and perpendicularly to the plane of the plate-type member 23.--;
    line 42: after "23." insert --It should be understood that the spacer members are substantially rigid members respectively forming a force-transmitting abutment so that the abutting edge surfaces can maintain the uniform planar configuration of the seat plate even while supporting the weight of a child seated thereon, as described herein.--;

UNITED STATES PATENT AND TRADEMARK OFFICE
CERTIFICATE OF CORRECTION

PATENT NO. : 5,669,623
DATED : September 23, 1997
INVENTOR(S) : Onishi

It is certified that error appears in the above-identified patent and that said Letters Patent is hereby corrected as shown below:

Col. 5:
- line 44: replace "the above" by --that of the above described spacer member 31--;
- line 58: replace "is" by --will be--.
- line 59: replace "so arbitrarily widened" by --be made arbitrarily as wide as desired so--;
- line 60: replace "sufficiently increased," by --sufficient for avoiding the--;
- line 61: delete "Thus, the mold 34 can be prevented from--;
- line 62: replace "its" by --the--, after "life" insert --of the mold--;

Col. 6:
- line 1: replace "The" by --Alternatively, the--;
- line 2: delete "not by the aforementioned";
- line 3: delete "insert molding but";
- line 4: replace "example." by --example, rather than by the aforementioned insert molding.--;
- line 5: after "Further," insert --as an alternative,";
- line 6: after "but" insert --rather--;
- line 7: delete "alterna-";
- line 8: delete "tively"; replace "in" by --during--;

UNITED STATES PATENT AND TRADEMARK OFFICE
CERTIFICATE OF CORRECTION

PATENT NO. : 5,669,623
DATED : September 23, 1997
INVENTOR(S) : Onishi

It is certified that error appears in the above-identified patent and that said Letters Patent is hereby corrected as shown below:

Col: 6:
    line 30: (actual line count):
        after "of" (first occurrence) insert --a baby sitting on--;
    line 31: (actual line count):
        after "of" insert --a baby sitting on--,
    line 32: (actual line count):
        after "comparative" insert --conventional--, replace "charged" by --filled or reinforced--;
    line 33: (actual line count):
        after "portions" insert --that were not hinged together--.
    line 45: (actual line count):
        delete "possible to sit a baby";
    line 46: (actual line count):
        replace "on" by --that--, after "invention" insert --provides a comfortable seat for the baby to sit--;
    line 47: (actual line count):
        replace "releasing" by --with--, after "thighs" insert --released or relieved--;
    line 49: (actual line count):
        replace "are not sunk" by --do not sink--; replace "receiving its" by --supporting the baby's--,
    line 59: (actual line count):
        after "and" insert --therefore a--; after "portion" insert --of the seat--.

UNITED STATES PATENT AND TRADEMARK OFFICE
CERTIFICATE OF CORRECTION

PATENT NO. : 5,669,623
DATED : September 23, 1997
INVENTOR(S) : Onishi

It is certified that error appears in the above-identified patent and that said Letters Patent is hereby corrected as shown below:

(Claim 1):
  Col. 6:
  line 65: (actual line count):
          replace "side" by --sides--;:
  Col. 7:
  line 3:   after "seat" insert --plate--
  line 13: replace "surface" by --surfaces--;
  line 17: replace "defined" by --defines--.

Signed and Sealed this

Twenty-first Day of April, 1998

Attest:

BRUCE LEHMAN

*Attesting Officer*    *Commissioner of Patents and Trademarks*